United States Patent [19]

Pietsch et al.

[11] Patent Number: 4,472,359
[45] Date of Patent: Sep. 18, 1984

[54] METHOD OF PRESSURE LEACHING

[75] Inventors: Hartmut Pietsch, Bad Homburg; Wolfgang Türke, Schöneck; Hubert Bings, Lünen; Karl-Josef Memmel, Staufenberg, all of Fed. Rep. of Germany

[73] Assignees: Metallgesellschaft AG, Frankfurt am Main; Vereinigte Aluminium-Werke AG, Bonn, both of Fed. Rep. of Germany

[21] Appl. No.: 351,507

[22] Filed: Feb. 23, 1982

[30] Foreign Application Priority Data

Feb. 27, 1981 [DE] Fed. Rep. of Germany ....... 3107368

[51] Int. Cl.$^3$ ............................................. C01G 43/00
[52] U.S. Cl. ......................................... 423/20; 423/1; 423/658.5; 423/150; 422/202
[58] Field of Search ................. 423/1, 658.5, 20, 150; 422/202

[56] References Cited

U.S. PATENT DOCUMENTS

| 1,787,795 | 1/1931 | Porter | 423/219 |
| 2,384,065 | 9/1945 | Balcar | 423/219 |
| 3,497,317 | 2/1970 | Tusche | 423/123 |
| 3,667,905 | 6/1972 | Jennings | 423/556 |

FOREIGN PATENT DOCUMENTS

| 1937392 | 9/1973 | Fed. Rep. of Germany . |
| 2458955 | 6/1975 | Fed. Rep. of Germany ...... 423/556 |

Primary Examiner—Herbert T. Carter
Attorney, Agent, or Firm—Karl F. Ross; Herbert Dubno

[57] ABSTRACT

A process of leaching ores, ore concentrates, intermediate metallurgical products and the like, which contain acid-soluble constituents, by a treatment in an acid aqueous solution under pressure in a tubular reactor. The slurry contains suitably 300 to 1100 g starting material per liter of water and a velocity of flow of 0.5 to 4.0 m/sec. is suitably maintained throughout the flow path in the tubular reactor of the slurry and of the leached suspension.

6 Claims, 1 Drawing Figure

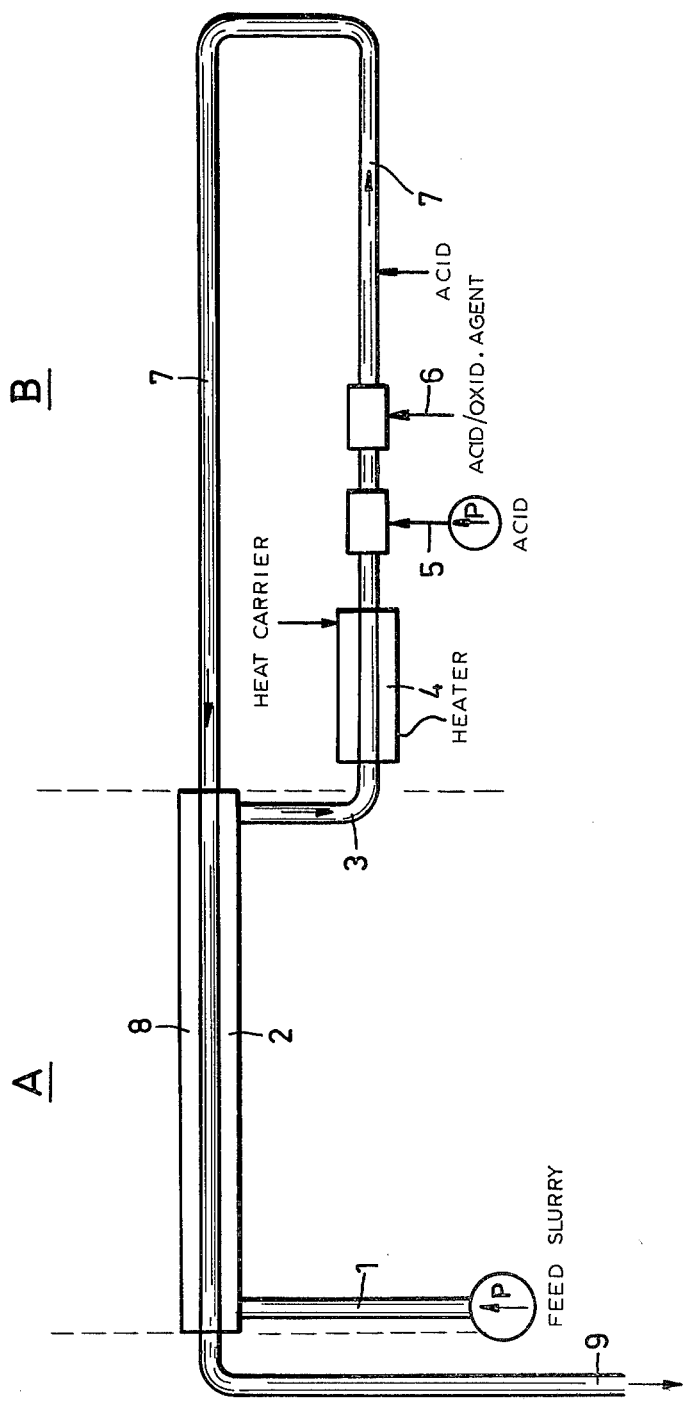

METHOD OF PRESSURE LEACHING

FIELD OF THE INVENTION

Our present invention relates to a pressure leaching process and, more particularly, to a method of leaching metal ores, ore concentrates, metallurgical intermediates and the like, especially the pressure digestion at an elevated temperature of a slurry of such products by acids.

BACKGROUND OF THE INVENTION

Acid-soluble concentrates of metal ores, ore concentrates and metallurgical intermediates can be leached or digested under pressure and at elevated temperatures in tube reactors.

For example, German patent document (printed application) No. DE-AS 19 37 392, discloses the pressure leaching of minerals, ores, or other materials by acid, alkaline or neutral aqueous medium in a tubular reactor utilizing a digestion tube.

In this system, a slurry of the material, hereinafter referred to as mineral material, is passed through the tubular reactor or digestion tube at a velocity of 0.5 to 7 meters per second and is treated in a turbulent flow with the leaching medium at temperatures up to and above 300° C. in a comparatively short time.

This continuous-flow method has decided advantages over a batch method utilizing an autoclave and methods utilizing a cascade of autoclaves.

In spite of these significant advantages, problems are encountered, primarily when an acid medium is utilized as the lixiviant.

In this case, all of the tube surfaces traversed by the reaction mixture, including any heating tubes through which the acid-containing mixture passes, must be composed of material having a high resistance to acid. In earlier systems, therefore, even the mantles, jackets or shell tubes of heat exchangers had to be manufactured from such acid resistant material, greatly increasing the capital and replacement cost of the equipment and leading to a process which suffered from poor economy.

Maximum utilization of the energy in the earlier systems also could not be ensured.

OBJECT OF THE INVENTION

It is the principal object of the present invention to provide an improved process for the acid leaching of mineral matter of the type described which obviates the aforementioned disadvantages and nevertheless can be carried out at a uniformly low cost with high energy economy.

SUMMARY OF THE INVENTION

These objects and others which will become apparent hereinafter are attained, in accordance with the present invention, by heating a slurry of mineral matter in water by passing it through a jet, mantle or shell tube of a tubular heat exchanger around a core tube to a temperature of at least 70° C., digesting the thus-heated slurry with acid in a tube section connected to this jacket, and then passing the digesting composition into the inner or core tube of the heat exchanger so that sensible heat from the digesting mixture is transferred to the fresh slurry in the jacket.

Except as otherwise provided herein, the materials treated, the medium used and the other process conditions and parameters, including solids content, velocity of flow, reaction temperature, residence time and heating fluid, can correspond to earlier tubular reactor leaching processes, especially that of the German patent document mentioned previously.

We have found that it is particularly advantageous to provide a slurry which is fed to the tubular reactor such that its solids content is 300 to 1100 grams per liter of water, thereby ensuring a reasonable relationship between the dimension and throughout capacity of the tubular reactor and the slurry.

The preferred velocity of the slurry throughout its flow path is 0.5 to 4.0 meters per second, a velocity which prevents segregation and deposition of solids and which also ensures a favorable relationship between the length of the tubular reactor and the residence time.

The acid can be fed to the second tube stage at a single point downstream of the heater. However, in large plants it has been found to be advantageous to supply the acid at several spaced apart locations along the second stage tube.

Frequently it is advantageous to carry out the leaching in the presence of an oxidizing agent. In this case, the oxidizing agent can be air, oxygen-enriched air or pure oxygen. Preferably, the oxidizing agent is added only in the second stage of the tubular reactor at one location or at a plurality of locations spaced along the second stage tube.

We have found that the method of this invention can be effectively used to digest or leach all ores, ore concentrates and metallurgical intermediates and like mineral matter containing components which can be solubilized in aqueous acid at elevated temperatures and pressures.

The nature of the acid employed, however, will depend on the starting material to be leached. Mineral acids, especially hydrochloric acid, nitric acid, sulfuric acid and phosphoric acid are preferred. In the best mode embodiment of this invention, the mineral matter includes uranium minerals, nickel oxide ores and nickel oxide ore concentrates. The leaching medium is preferably sulfuric acid with a concentration of 10 to 20% $H_2SO_4$.

We have found it to be advantageous to feed the acid into the tubular reactor in such proportion to the slurry that a slight excess of free acid is found following the digestion. In the preferred mode of operation, the sulfuric acid is added in an amount such that the final composition, i.e. the leach suspension still contains 10 to 30 grams of free acid per liter.

While the temperature at which the leaching is carried out will depend largely upon the composition of the materials to be leached, we have found that temperatures between 130° C. and 280° C. are sufficient for practically all purposes, and that in the best mode the temperature should be between 140° C. and 180° C.

The mineral matter is preferably comminuted to have a median particle diameter below 250 microns and preferably below 150 microns, the median diameter being that diameter below which the particle size of 50% of the material and above which the particle diameter of 50% of the material can be found. The particle size spectrum can be continuous.

When a gaseous oxidizing agent is supplied, the oxygen partial pressure of the latter should be between 20 and 100 bar. About 2 to 20 kilograms of oxygen per metric ton of mineral matter will generally be used, e.g. in the processing of uranium minerals.

While the method and device of this invention is highly advantageous in that the shell tube or jacket which is used to heat the slurry need not be acid-resistant, the process has been found to be energetically more efficient and hence, considering all of the operating costs, significantly more economical. Furthermore, even if sulfuric acid is used, precipitation of calcium sulfate in the heating section is avoided, such precipitation adversely affecting heat exchange.

BRIEF DESCRIPTION OF THE DRAWING

The above and other objects, features and advantages of the present invention will become more readily apparent from the following description, reference being made to the accompanying drawing, the sole FIGURE of which is a diagram of a plant for carrying out the process.

SPECIFIC DESCRIPTION

A previously prepared slurry of the starting material in water is fed, e.g. by means of a piston pump through the connecting pipe 1 into the shell or tube jacket 2, which extends throughout the length of section A of the tubular reactor.

In the shell tube, the slurry is heated to at least 70° C. by the hot leached suspension.

The slurry then flows through the tube 3 into the heater 4, in which the slurry is heated further with steam or a heat transfer salt to or almost to the reaction temperature.

Acid is supplied to the heated slurry by a proportioning pump through a conduit 5.

A device 6 is operable to add additional acid or gaseous oxidizing agent. The leaching reaction takes place in the succeeding tube section 7. The dimension and throughput capacity of the tube section 7 are so selected relative to each other that the reaction will be completed before the leached suspension enters the tube section 8, which is surrounded by the shell tube 2. The parts 4 to 7 form the section B of the tubular reactor.

The substantially cooled suspension is discharged from the plant in conduit 9 and is flashed (pressure released) and processed further in conventional manner.

SPECIFIC EXAMPLES

Example 1

A uranium ore was provided, which had a density of 2.7 g/cm$^3$ and contained 150 g U$_3$O$_8$ per metric ton, 90% by weight SiO$_2$, balance Fe, Ti, Al, mainly as oxidic compounds and pyrite, and had been ground to a median particle diameter of 125 μm. A slurry containing 1000 g ore per liter of water was formed from that ore and was supplied through the connecting pipe 1 into the shell tube 2 of the section A of the tubular reactor. In the shell tube 2, the slurry was heated to 130° C. by a heat exchange with the leached suspension, which was caused to flow back through the tube 8.

The slurry was then supplied through the tube section 3 into the heater 4 and was heated further in the latter to 140° C. with saturated steam. Sulfuric acid containing 15% H$_2$SO$_4$ was continuously supplied to the slurry through conduit 5 at a rate of 20 g per liter of slurry. Oxygen was continuously supplied to the slurry through the device 6 at a rate of 8 g per liter of suspension.

By the exothermic reaction taking place, the slurry was heated to 160° C. After a residence time of 12 minutes in the tube section 7, the resulting leached suspension was cooled in the tube section 8° to 50° C., whereby the fresh slurry supplied was heated to 130° C.

A velocity of flow of 2.5 m/sec. was maintained in the tubular reactor.

The resulting leached suspension contained in its aqueous phase 93% of the initially supplied uranium and 25 g free sulfuric acid per liter. This suspension was then subjected to solvent extraction by a conventional process.

Example 2

The starting material consisted of a lateritic nickel ore which contained 1.48% by weight Ni
0.15% by weight Co
8.0% by weight MgO
30.0% by weight Fe$_2$O$_3$
balance substantially SiO$_2$ and had been ground to a median particle diameter of 85 μm.

500 g of the ore were slurried in one liter water and the slurry was supplied through connecting pipe 1 into the shell tube 2 of the section A of the tubular reactor and was heated therein to 210° C.

The slurry which had passed through the tube section 3 was heated with superheated steam to 260° C. in the heater 4. Sulfuric acid containing 20% H$_2$SO$_4$ was added at 5 at such a rate that the leached suspension which was discharged from the tubular reactor still contained 15 g free acid per liter. Oxygen at a rate of 1.5 g per liter of slurry was added by the device 6. The acid and oxygen were continuously added.

After a residence time of 5.5 minutes in the tube section 7, the resulting leached suspension was cooled to 60° C. by the fresh slurry, which was thus heated to 210° C.

A velocity of flow of 2.6 m/sec. was maintained in the tubular reactor.

The resulting leached suspension contained in its aqueous phase 98% of the nickel contained in the starting ore. The nickel was recovered from that suspension by conventional methods.

We claim:

1. A method of pressure leaching a mineral material in the form of a metal ore which comprises the steps of:
   (a) heating a slurry of said mineral material in water by passing said slurry through a jacket surrounding an inner tube of a tube heat exchanger forming a first section of a tubular reactor to a temperature of at least 70° C.;
   (b) thereafter passing the heated slurry through a second section of said tubular reactor;
   (c) introducing a leaching acid medium into said second section to digest and leach the mineral matter therein; and
   (d) cooling the resulting suspension by passing the same through said inner tube of said heat exchanger whereby said mixture is cooled in indirect heat exchange with the slurry in step (a) and the acid medium contacts only the inner tube of said heat exchanger as said slurry traverses said heat exchanger.

2. The method defined in claim 1 which comprises the step of forming the slurry of step (a) with 300 to 1100 g of said material per liter of water.

3. The method defined in claim 1 wherein the slurry is passed through said sections at a velocity of flow of 0.5 to 4.0 meters/second.

4. The method defined in claim 1 wherein said medium is introduced into said second section in step (c) at a plurality of locations therealong.

5. The method defined in claim 1, further comprising the step of introducing an oxidizing gas into said mixture in said second section.

6. The method defined in claim 1, claim 2, claim 3 or claim 4 wherein said material is a uranium-containing mineral and said medium is added in an amount such that 10 to 30 g per liter of free acid remains upon cooling in step (d).

* * * * *